US008931360B2

(12) United States Patent
Hsu et al.

(10) Patent No.: US 8,931,360 B2
(45) Date of Patent: Jan. 13, 2015

(54) LINKAGE-TYPE SYNCHRONIZATION MODULE STRUCTURE

(75) Inventors: An Szu Hsu, New Taipei (TW); Way Han Dai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 286 days.

(21) Appl. No.: 13/453,161

(22) Filed: Apr. 23, 2012

(65) Prior Publication Data

US 2013/0276267 A1 Oct. 24, 2013

(51) Int. Cl.
*F16H 21/44* (2006.01)
*F16H 21/54* (2006.01)
*F16H 25/18* (2006.01)
*H04M 1/00* (2006.01)

(52) U.S. Cl.
USPC .......... 74/100.1; 455/575.4

(58) Field of Classification Search
CPC . H04M 1/0237; H04M 1/0235; G06F 1/1624; E05D 15/0621
USPC .......... 74/101, 102, 103, 104, 100.1, 490.13, 74/503; 455/575.1, 575.4, 348; 361/679.21, 679.27; 16/352; 296/216.04, 155, 146.2, 223; 49/404, 49/405, 345, 346, 130, 291, 502
See application file for complete search history.

(56) References Cited

U.S. PATENT DOCUMENTS 6,504,707 B2 * 1/2003 Agata et al. .......... 361/679.05
2009/0069059 A1 * 3/2009 Min et al. .......... 455/575.4
2009/0147453 A1 * 6/2009 Hsieh et al. .......... 361/679.02
2010/0041450 A1 * 2/2010 Wang et al. .......... 455/575.4
2010/0144409 A1 * 6/2010 Huang et al. .......... 455/575.4
2010/0160009 A1 * 6/2010 Tang .......... 455/575.4
2010/0197371 A1 * 8/2010 Hsu .......... 455/575.4
2010/0267429 A1 * 10/2010 Endo et al. .......... 455/575.4
2010/0291979 A1 * 11/2010 Jeong et al. .......... 455/575.4
2011/0007469 A1 * 1/2011 Kemppinen .......... 361/679.08
2011/0167592 A1 * 7/2011 Han .......... 16/362
2012/0149446 A1 * 6/2012 Chen et al. .......... 455/575.4
2012/0194053 A1 * 8/2012 Hsu et al. .......... 312/319.1

FOREIGN PATENT DOCUMENTS

WO WO/2010/041885 * 4/2010 .......... H04B 1/38

* cited by examiner

*Primary Examiner* — Troy Chambers
*Assistant Examiner* — Jake Cook
(74) *Attorney, Agent, or Firm* — Rosenberg, Klein & Lee

(57) ABSTRACT

A synchronization structure applicable to a slide cover to ensure synchronous movement and avoid deflection includes a slide member, a relative slide member and two extensible/retractable linkage assemblies. Second ends of the extensible/retractable assemblies are respectively pivotally connected to corresponding sections of two sides of the slide member. First ends of the extensible/retractable assemblies are connected with each other and restricted by a middle slide guide section between the slide member and the relative slide member. Two fixed support sections are respectively oppositely disposed on lateral sides of the middle slide guide section. The extensible/retractable assemblies are formed with slide guide sections in which the fixed support sections are fitted. A restriction slide guide mechanism is disposed between each extensible/retractable assembly and the relative slide member for cooperatively guiding the extensible/retractable assemblies to pivotally rotate and extend/retract so as to synchronize the moves of two sides of the slide member.

31 Claims, 6 Drawing Sheets

LINKAGE-TYPE SYNCHRONIZATION MODULE STRUCTURE

BACKGROUND OF THE INVENTION

1. Field of the Invention

The present invention relates generally to a linkage-type synchronization module structure, and more particularly to a synchronization module structure, which is easy to assemble and widely applicable to the slide cover system of an electronic product. Also, the linkage-type synchronization module structure can ensure synchronous move.

2. Description of the Related Art

U.S. Pat. No. 5,548,478 discloses a portable computing device having an adjustable hinge. The computing device mainly includes a base section (mainframe) 91 and a display section 92 movably assembled with the base section 91. A pair of pivot pins 921 respectively outward protrudes from left and right sides of the bottom of the display section 92. The pivot pins 921 are correspondingly slidably disposed in a pair of slide slots 911 longitudinally formed on left and right sides of the mainframe 91. Accordingly, the display section 92 not only can be pivotally rotated relative to the mainframe 91 to change the view angle, but also can be back and forth slid relative to the mainframe 91 to adjust the position and achieve an optimal view distance as necessary.

However, in practical operation, a user often simply pushes one side of the display section 92 with one single hand. As a result, the push force applied to the left and right pivot pins 921 of the display section 92 can be hardly uniformed. Therefore, during the sliding process, the display section 92 is likely to be slightly biased to one side. This will seriously hinder the display section 92 from smoothly sliding.

In order to solve the above problem, a prior art discloses an anti-deflection device for slide cover of an electronic apparatus. The anti-deflection device includes a first transmission unit and a second transmission unit. The electronic apparatus includes a base section and a slide section movably assembled with the base section. One side of the slide section has two slide connection ends slidably disposed on two lateral sides of the base section. The first transmission unit has two idler sets respectively disposed on inner sides of the lateral sides of the base section and at least one transmission belt longitudinally wound around the idler sets. Two sections of the transmission belt opposite to the outer sides are respectively connected with the slide connection ends. Accordingly, the slide connection ends with the transmission belt can be back and forth moved. The second transmission unit is disposed between the idler sets of the first transmission unit with the transmission belt wound around the second transmission unit, whereby the sections of the transmission belt, which are connected with the slide connection ends can be moved in the same direction. Accordingly, when one of the slide connection ends is back and forth moved, the other of the slide connection ends is driven via the first and second transmission units so as to ensure that the two slide connection ends are synchronously moved in the same direction without deflection.

However, in the above structure, the transmission belt itself is elastically extensible. Therefore, in the operation, the transmission of kinetic energy will be delayed. As a result, when slid, the slide cover or slide assembly of the electronic product will be still inevitably deflected. Moreover, after a long period of use, elastic fatigue of the transmission belt will take place. Under such circumstance, the transmission belt will lose its prestress, which is preset in the assembling process. This will lead to idling between the transmission belt and the idler sets and deterioration of the synchronous driving effect of the transmission belt. In some more serious cases, the transmission belt may detach from the idler sets to totally lose its synchronous driving effect. Furthermore, in order to keep the transmission belt in close contact with the idler sets, the transmission belt must be properly tensioned and prestressed in the assembling process. In this case, the difficulty in assembling and quality control will be increased to lower the assembling efficiency and the ratio of good products.

SUMMARY OF THE INVENTION

It is therefore a primary object of the present invention to provide a linkage-type synchronization module structure. The components of the linkage-type synchronization module structure have excellent structural rigidity and are able to quickly transmit driving force. Accordingly, when a force is applied to one single side of the slide member, the slide member can be slid with its two lateral sides kept synchronously moved without deflection. Accordingly, the slide member is prevented from being biased so as to ensure smooth slide of the slide member.

It is a further object of the present invention to provide the above linkage-type synchronization module structure. The assembling process of the linkage-type synchronous slide structure is simplified so that the assembling efficiency is promoted and the ratio of good products is increased to enhance the competitive ability of the products.

It is still a further object of the present invention to provide the above linkage-type synchronization module structure, which has simplified mechanism to lower manufacturing cost.

To achieve the above and other objects, the linkage-type synchronization module structure of the present invention includes a slide member, a relative slide member relatively slidably connected with the slide member, and two extensible/retractable assemblies. One end of one of the extensible/retractable assemblies and one end of the other of the extensible/retractable assemblies are respectively pivotally connected to corresponding sections of two lateral sides of the slide member. The other end of one of the extensible/retractable assemblies and the other end of the other of the extensible/retractable assemblies are slidably pivotally connected with each other and restricted by a middle slide guide section disposed between the slide member and the relative slide member. Two fixed support sections are respectively oppositely disposed on two lateral sides of the middle slide guide section. The extensible/retractable assemblies are formed with slide guide sections in which the fixed support sections are fitted. A restriction slide guide mechanism is disposed between each extensible/retractable assembly and the relative slide member.

In the above linkage-type synchronization module structure, the restriction slide guide mechanism is composed of two lateral slide guide sections oppositely disposed on two lateral sides of the middle slide guide section and two movable slide guide members disposed in the slide guide sections of the extensible/retractable assemblies. The movable slide guide members respectively extend into the lateral slide guide sections.

In the above linkage-type synchronization module structure, the fixed support sections are positioned between the middle slide guide section and the lateral slide guide sections. The fixed support sections are projecting pins projecting from a surface of the relative slide member. The slide guide sections are through slots axially extending along the extensible/ retractable assemblies. The projecting pins extend into the through slots for guiding the extensible/retractable assemblies to slide.

In the above linkage-type synchronization module structure, a pivotal shaft rod passes through the pivotally connected sections of the two extensible/retractable assemblies and extends into the middle slide guide section to pivotally connect the pivotally connected sections with each other.

In the above linkage-type synchronization module structure, two support sections are respectively oppositely disposed on two lateral sides of the slide member. Two second pivoted ends are disposed at the corresponding ends of the extensible/retractable assemblies and pivotally connected with the support sections. The support sections are pivot pins projecting from a surface of the slide member, while the second pivoted ends are pinholes.

In the above linkage-type synchronization module structure, each extensible/retractable assembly is composed of a first link and a second link connected with each other. The connected end sections of the first and second links are respectively formed with a first slide guide section and a second slide guide section extending in the extending/retracting direction of the extensible/retractable assemblies. The first and second slide guide sections are slots. After connected, the first and second slide guide sections together form the slide guide sections.

In the above linkage-type synchronization module structure, the lateral slide guide sections are disposed on the relative slide member and extend in a straight form or an arched form.

In the above linkage-type synchronization module structure, the lateral slide guide sections are slide slots disposed on the relative slide member, while the movable slide guide members are pin members extending into the lateral slide guide sections.

In the above linkage-type synchronization module structure, the middle slide guide section is a slide slot disposed on the relative slide member.

In the above linkage-type synchronization module structure, two outer slide guide sections are respectively disposed on two lateral edges of one of the slide member and the relative slide member. The outer slide guide sections are guide rails formed of bent edges.

The present invention can be best understood through the following description and accompanying drawings, wherein:

DETAILED DESCRIPTION OF THE PREFERRED EMBODIMENTS

Figure 1:
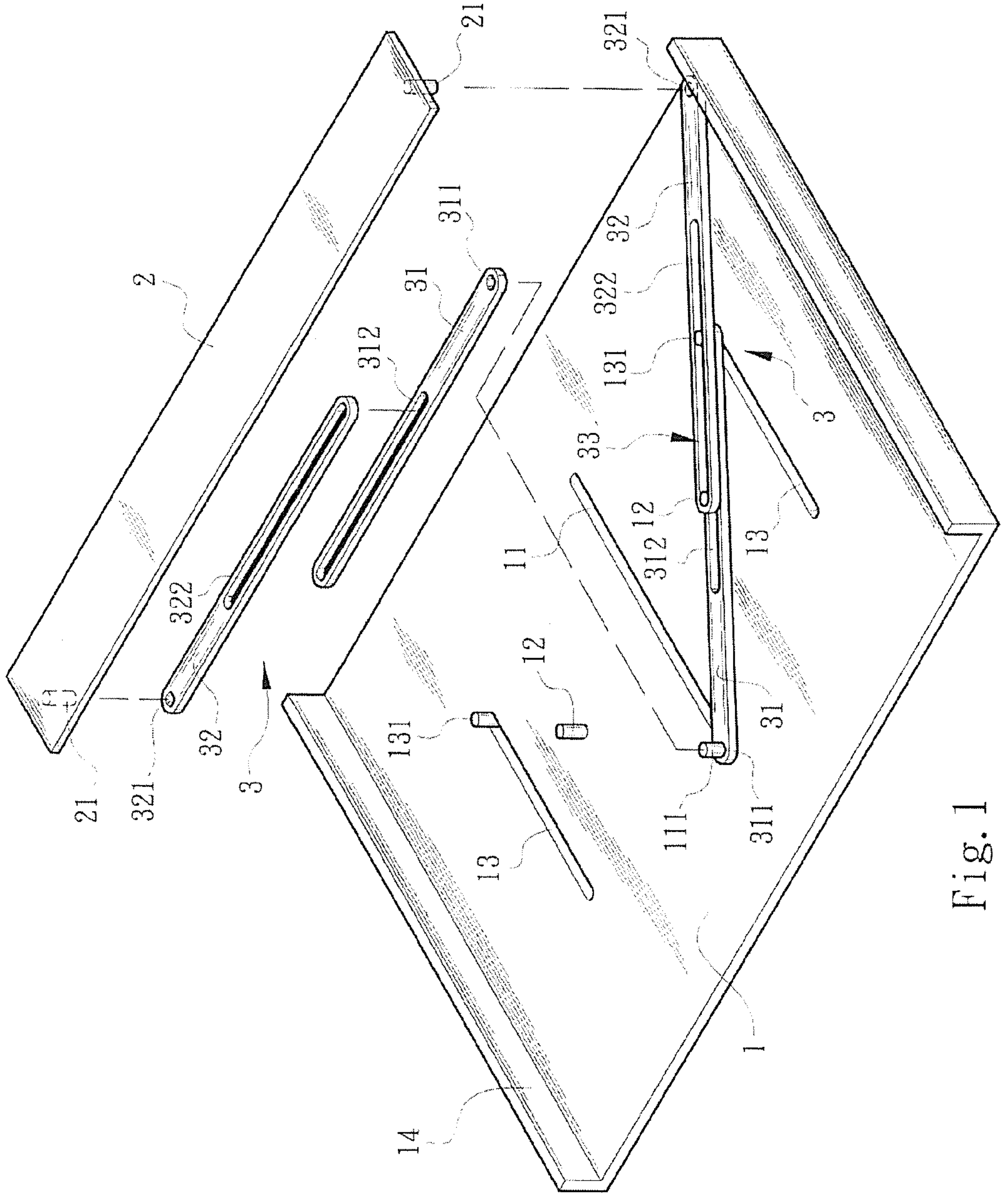
FIG. 1 is a perspective exploded view of a first embodiment of the present invention.
Figure 2:
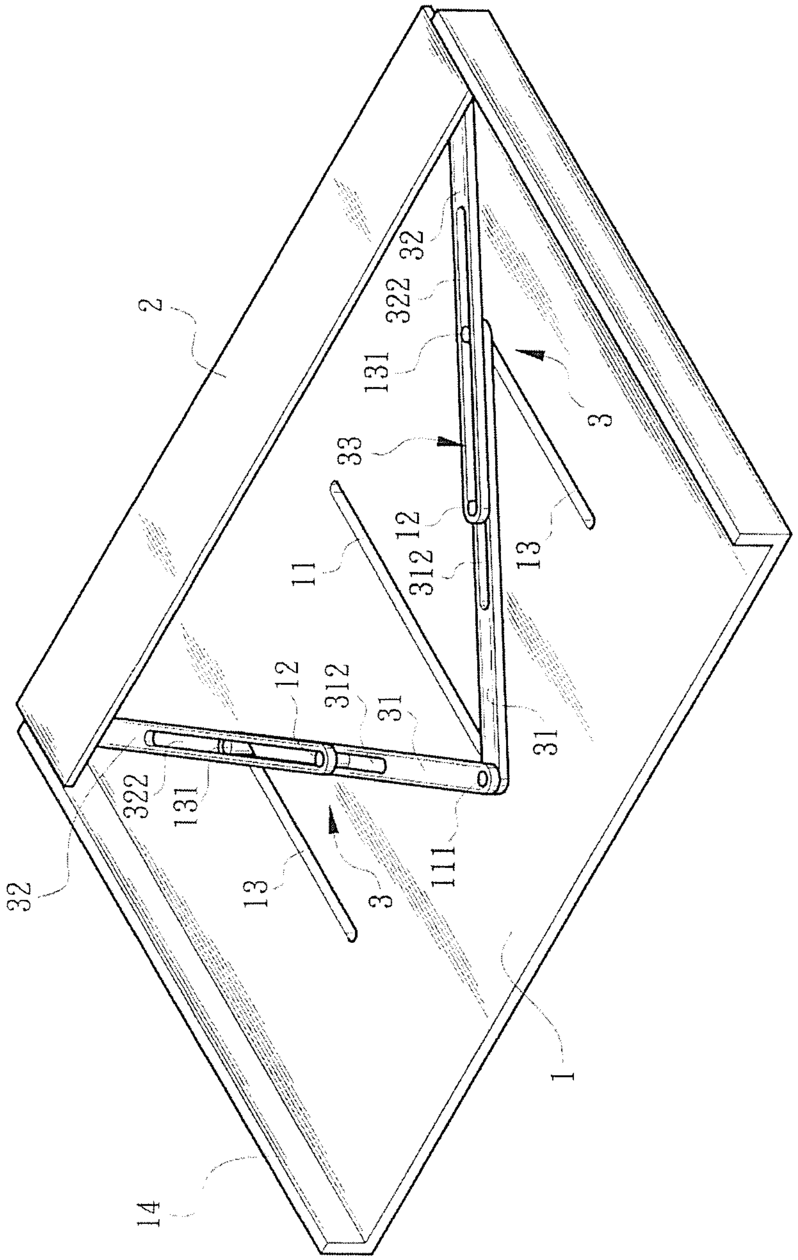
FIG. 2 is a perspective assembled view of the first embodiment of the present invention.

Please refer to FIGS. 1 and 2. According to a first embodiment, the linkage-type synchronization module structure of the present invention includes a relative slide member 1, a slide member 2 and two extensible/retractable assemblies 3. A middle section of the relative slide member 1 is formed with a middle slide guide section 11, (which can be a slide slot). Two lateral slide guide sections 13, (which can be two slide slots), are respectively oppositely disposed on two lateral sides of the middle slide guide section 11. In addition, two fixed support sections 12 are respectively oppositely disposed on the two lateral sides of the middle slide guide section 11. (The fixed support sections 12 can be projecting pins projecting from a surface of the relative slide member 1). The fixed support sections 12 are positioned between the middle slide guide section 11 and the lateral slide guide sections 13. A movable slide guide member 131, (which can be a pin member), is disposed in each lateral slide guide section 13 and slidable within the lateral slide guide section 13. The movable slide guide members 131 and the lateral slide guide sections 13 are connected with each other to form restriction slide guide mechanisms. Two outer slide guide sections 14 are respectively disposed on two lateral edges of the relative slide member 1 (or the slide member 2). The outer slide guide sections 14 can be guide rails formed of bent edges. The outer slide guide sections 14 serve to restrict the sliding direction of the slide member 2 (or the relative slide member 1). The slide member 2 is disposed on one face of the relative slide member 1 and slidable relative to the relative slide member 1 along the middle slide guide section 11. Two support sections 21, (which can be pivot pins projecting from a surface of the slide member 2), are respectively oppositely disposed on two lateral sides of the slide member 2. Each extensible/retractable assembly 3 is composed of a first link 31 and a second link 32 connected to the first link 31. The connected ends of the first and second links 31, 32 are respectively formed with a first slide guide section 312 and a second slide guide section 322, (which can be two slots). The first and second slide guide sections 312, 322 extend in an extending/retracting direction of the extensible/retractable assembly 3. After connected, the first and second slide guide sections 312, 322 form a through slide guide section 33. The slide guide section 33 is combined with the restriction slide guide mechanism of the relative slide member 1 (in such a manner that the fixed support section 12 is fitted in the slide guide section 33, while the movable slide guide member 131 extends into the slide guide section 33). The other ends of the first and second links 31, 32 are respectively formed with a first pivoted section 311 and a second pivoted end 321, (which can be two pinholes). The support sections 21 (pivot pins) of two lateral sides of the slide member 2 are pivotally connected to the second pivoted ends 321 (pinholes), while a pivotal shaft rod 111 is pivotally fitted in the two first pivoted ends 311 (pinholes) and extends into the middle slide guide section 11 to provide a slide guide effect.

Figure 3:
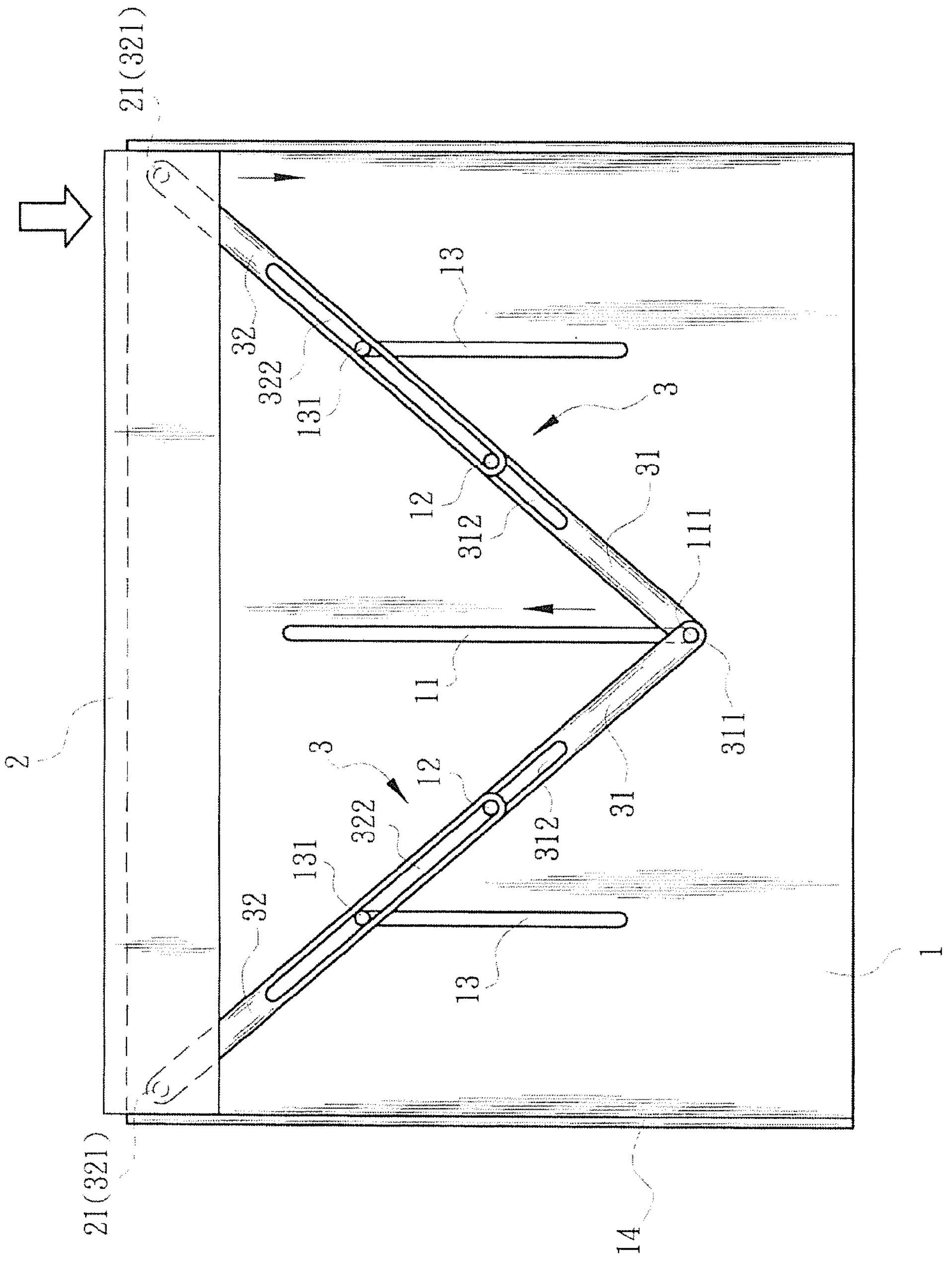
FIG. 3 is a plane view showing the operation of the first embodiment of the present invention in one state.
Figure 4:
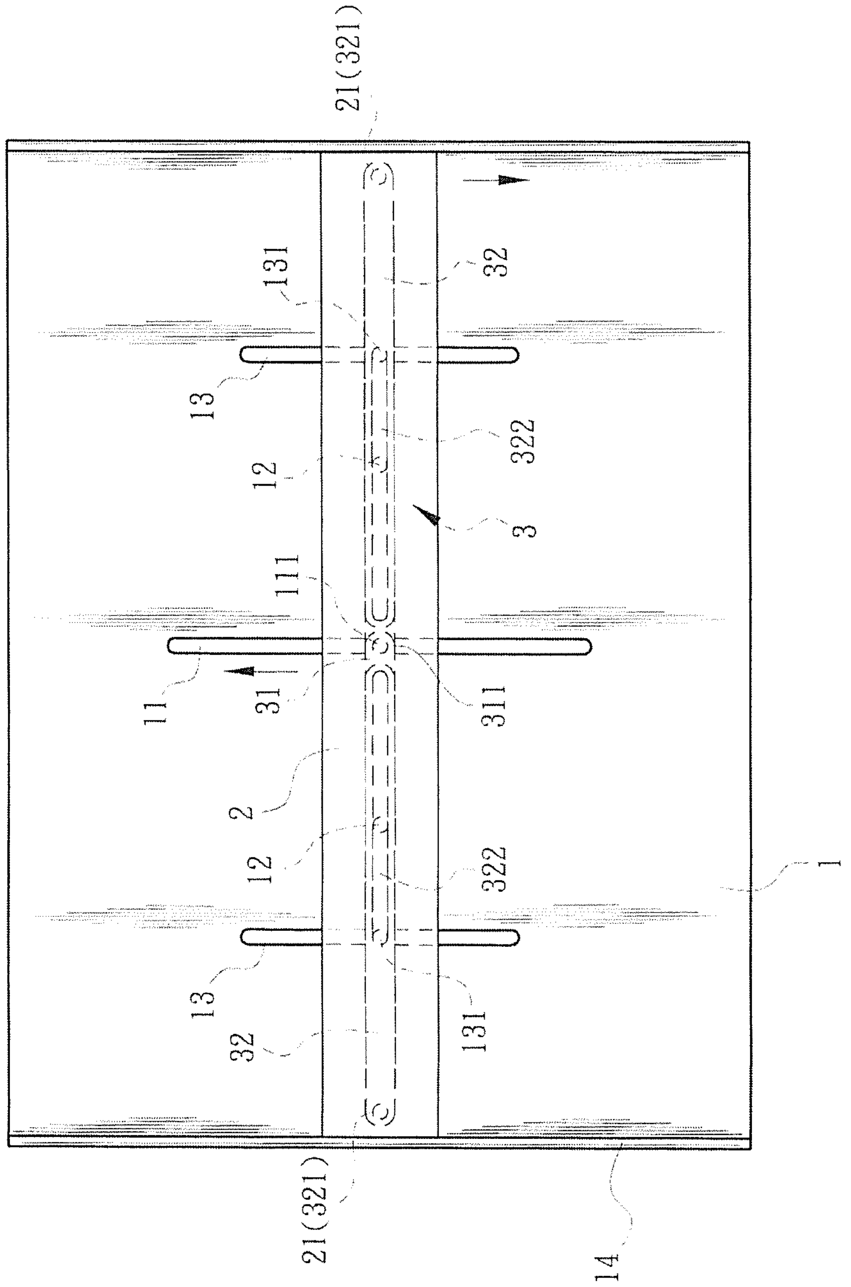
FIG. 4 is a plane view showing the operation of the first embodiment of the present invention in another state.
Figure 5:
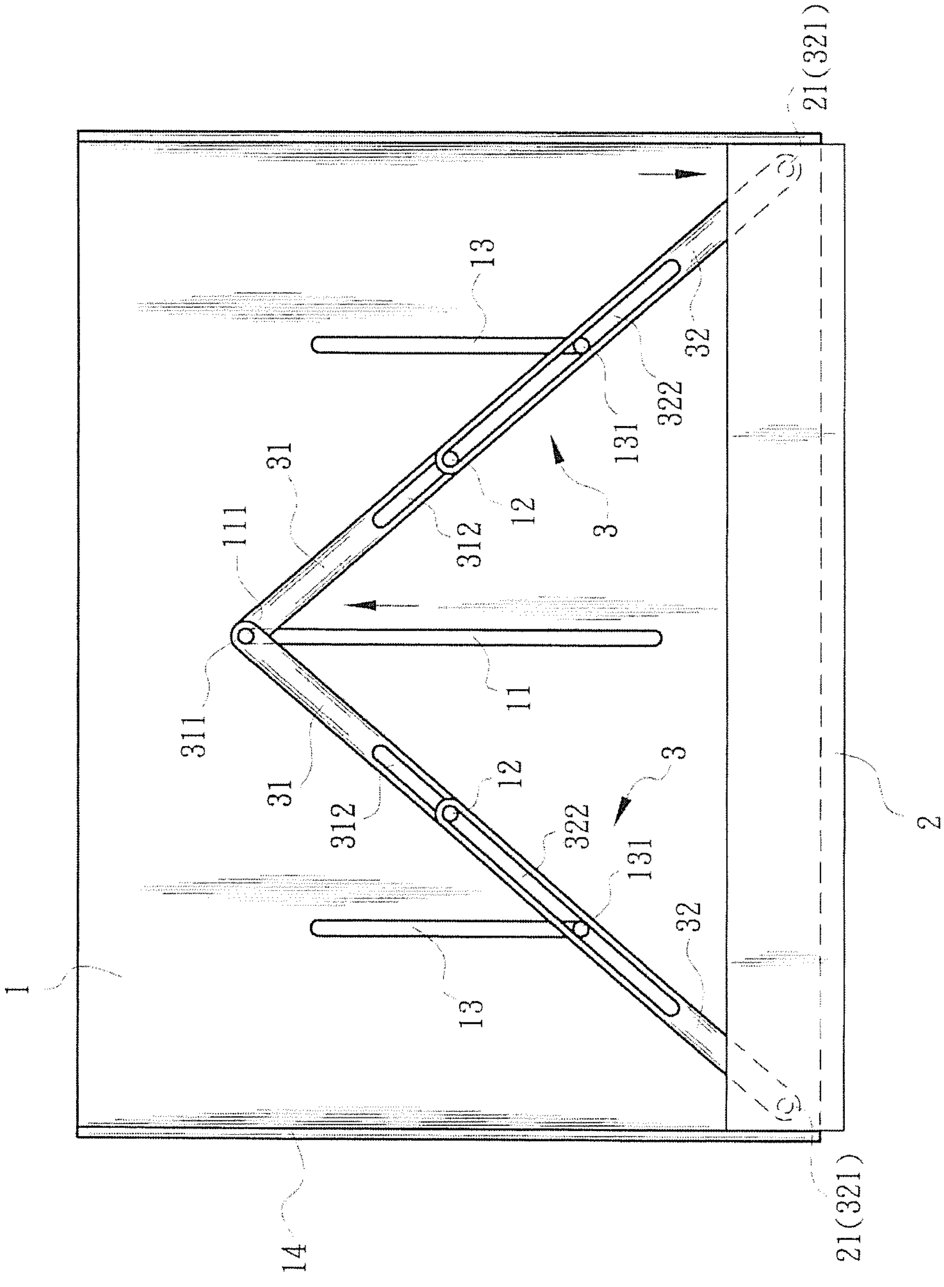
FIG. 5 is a plane view showing the operation of the first embodiment of the present invention in still another state.

Please now refer to FIGS. 3 to 5. In operation of the first embodiment of the present invention, when the slide member 2 is positioned in an initial fully closed (or fully opened) position at one end of the relative slide member 1 as shown in FIG. 3, the ends (the second pivoted ends 321) of the two extensible/retractable assemblies 3 are respectively obliquely connected with two ends (support sections 21) of the slide member 2. In this case, the extensible/retractable assemblies 3 have a longest length. When a force is applied to one side of the slide member 2 to slide the slide member 2, the length of the extensible/retractable assembly 3 (the first and second links 31, 32) on the forced side is gradually shortened. In addition, under the restriction of the fixed support section 12, the extensible/retractable assembly 3 on the forced side starts to pivotally rotate. At this time, the movable slide guide member 131 slides along both the slide guide section 33 (the first and second slide guide sections 312, 322) and the lateral slide guide section 13. At the same time, the other end (the first pivoted end 311) of the extensible/retractable assembly 3 slides along the middle slide guide section 11 with the pivotal shaft rod 111. In the meantime, the pivotal shaft rod 111 synchronously drives the first pivoted end 311 of the extensible/retractable assembly 3 on the other side to slide. Under the restriction of the fixed support section 12, the extensible/retractable assembly 3 on the other side starts to pivotally rotate in a reverse direction. During the pivotal rotation, the length of the extensible/retractable assembly 3 on the other side is synchronously shortened. When the slide member slides to a position where the two extensible/retractable assemblies 3 are lined up, the two extensible/retractable assemblies 3 have a shortest length (as shown in FIG. 4). After the slide member 2 passes through the position as shown in FIG. 4, the two extensible/retractable assemblies 3 are continuously pivotally rotated around the fixed support sections 12 and the length of the extensible/retractable assemblies 3 is gradually increased until the slide member 2 slides to a final fully opened (or fully closed) position at the other end of the relative slide member 1 as shown in FIG. 5. By means of the pivotal shaft rod 111, the two extensible/retractable assemblies 3 are synchronously driven to extend/retract. Accordingly, the slide member 2 can be slid with its two lateral sides kept synchronously moved without deflection. Accordingly, the slide member 2 is prevented from being biased due to unbalanced force applied to one single side of the slide member 2 so as to ensure smooth slide thereof.

Moreover, during the relative slide process of the slide member 2 and the relative slide member 1, when the two extensible/retractable assemblies 3 are pivotally rotated, the first pivoted ends 311 are restricted to move along the middle slide guide section 11 by the pivotal shaft rod 111, while the second pivoted ends 321 are restricted to move along the track of the support sections 21 of two lateral sides of the slide member 2. Therefore, the first and second links 31, 32 will slide relative to each other to extend/retract the extensible/retractable assemblies 3. At this time, the first slide guide sections 312 will absorb the relative move between the first links 31 and the fixed support sections 12 and the second slide guide sections 322 will absorb the relative move between the second links 32 and the movable slide guide members 131. In addition, the fixed support sections 12 and the movable slide guide members 131 are kept within the slide guide sections 33 (the first and second slide guide sections 312, 322), whereby during the extending/retraction process, the first and second links 31, 32 can keep lined up and extensibly/retractably connected with each other.

Figure 6:
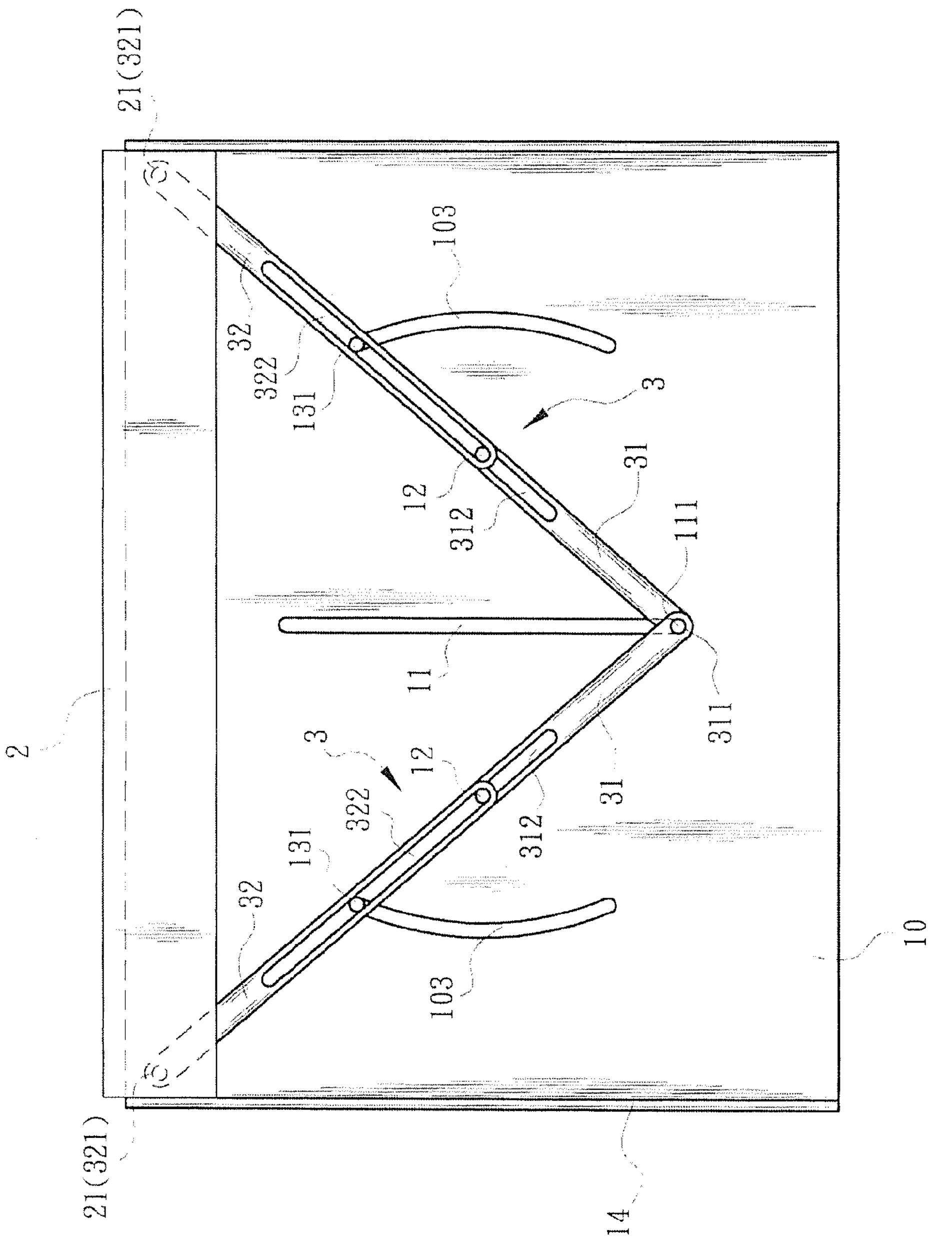
FIG. 6 is a plane view of a second embodiment of the present invention.

Please now refer to FIG. 6, which is a plane view of a second embodiment of the present invention. The structure of the second embodiment is based on the structure of the first embodiment, including a slide member 2, a relative slide member 10 and two extensible/retractable assemblies 3 as the first embodiment. The second embodiment is only different from the first embodiment in that two arched lateral slide guide sections 103 are respectively disposed on two lateral sides of the middle slide guide section 11 of the relative slide member 10. Except this, the structure of the relative slide member 10 is identical to the relative slide member 1 of the first embodiment. In practice, the arched lateral slide guide sections 103 can achieve the same effect as the straight lateral slide guide sections 13 of the first embodiment.

In conclusion, the linkage-type synchronization module structure of the present invention is easy to assemble and able to ensure synchronous move.

The above embodiments are only used to illustrate the present invention, not intended to limit the scope thereof. Many modifications of the above embodiments can be made without departing from the spirit of the present invention.

What is claimed is:

1. A linkage-type synchronization module structure comprising:

a slide member;

a relative slide member relatively slidably connected with the slide member; and two extensible/retractable assemblies, one end of one of the extensible/retractable assemblies and one end of the other of the extensible/retractable assemblies being respectively pivotally connected to corresponding sections of two lateral sides of the slide member, the other end of one of the extensible/retractable assemblies and the other end of the other of the extensible/retractable assemblies being pivotally connected with each other to define a pivotal joint, the pivotal joint slidably engaged in linearly restricted manner with a middle slide guide section disposed between the slide member and the relative slide member, the two extensible/retractable assemblies maintaining a substantially symmetrical pivotal angle with respect to the middle slide guide section, two fixed support sections being respectively oppositely disposed on two lateral sides of the middle slide guide section, the extensible/retractable assemblies being formed with slide guide sections in which the fixed support sections are fitted, a restriction slide guide mechanism being disposed between each extensible/retractable assembly and the relative slide member.

2. The linkage-type synchronization module structure as claimed in claim 1, wherein the restriction slide guide mechanism is composed of two lateral slide guide sections oppositely disposed on two lateral sides of the middle slide guide section and two movable slide guide members disposed in the slide guide sections of the extensible/retractable assemblies, the movable slide guide members respectively extending into the lateral slide guide sections.

3. The linkage-type synchronization module structure as claimed in claim 2, wherein the fixed support sections are positioned between the middle slide guide section and the lateral slide guide sections, the fixed support sections being projecting pins projecting from a surface of the relative slide member, the slide guide sections being through slots axially extending along the extensible/retractable assemblies, the projecting pins extending into the through slots for guiding the extensible/retractable assemblies to slide.

4. The linkage-type synchronization module structure as claimed in claim 1, wherein a pivotal shaft rod passes through the pivotally connected sections of the two extensible/retractable assemblies and extends into the middle slide guide section to pivotally connect the pivotally connected sections with each other.

5. The linkage-type synchronization module structure as claimed in claim 2, wherein a pivotal shaft rod passes through the pivotally connected sections of the two extensible/retractable assemblies and extends into the middle slide guide section to pivotally connect the pivotally connected sections with each other.

6. The linkage-type synchronization module structure as claimed in claim 1, wherein two support sections are respectively oppositely disposed on two lateral sides of the slide member, two second pivoted ends being disposed at the corresponding ends of the extensible/retractable assemblies and pivotally connected with the support sections, the support sections being pivot pins projecting from a surface of the slide member, while the second pivoted ends being pinholes.

7. The linkage-type synchronization module structure as claimed in claim 2, wherein two support sections are respectively oppositely disposed on two lateral sides of the slide member, two second pivoted ends being disposed at the corresponding ends of the extensible/retractable assemblies and pivotally connected with the support sections, the support sections being pivot pins projecting from a surface of the slide member, while the second pivoted ends being pinholes.

8. The linkage-type synchronization module structure as claimed in claim 4, wherein two support sections are respectively oppositely disposed on two lateral sides of the slide member, two second pivoted ends being disposed at the corresponding ends of the extensible/retractable assemblies and pivotally connected with the support sections, the support sections being pivot pins projecting from a surface of the slide member, while the second pivoted ends being pinholes.

9. The linkage-type synchronization module structure as claimed in claim 1, wherein each extensible/retractable assembly is composed of a first link and a second link connected with each other.

10. The linkage-type synchronization module structure as claimed in claim 2, wherein each extensible/retractable assembly is composed of a first link and a second link connected with each other.

11. The linkage-type synchronization module structure as claimed in claim 4, wherein each extensible/retractable assembly is composed of a first link and a second link connected with each other.

12. The linkage-type synchronization module structure as claimed in claim 5, wherein each extensible/retractable assembly is composed of a first link and a second link connected with each other.

13. The linkage-type synchronization module structure as claimed in claim 9, wherein the connected end sections of the first and second links are respectively formed with a first slide guide section and a second slide guide section extending in the extending/retracting direction of the extensible/retractable assemblies, the first and second slide guide sections being slots, after connected, the first and second slide guide sections together forming the slide guide sections.

14. The linkage-type synchronization module structure as claimed in claim 10, wherein the connected end sections of the first and second links are respectively formed with a first slide guide section and a second slide guide section extending in the extending/retracting direction of the extensible/retractable assemblies, the first and second slide guide sections being slots, after connected, the first and second slide guide sections together forming the slide guide sections.

15. The linkage-type synchronization module structure as claimed in claim 11, wherein the connected end sections of the first and second links are respectively formed with a first slide guide section and a second slide guide section extending in the extending/retracting direction of the extensible/retractable assemblies, the first and second slide guide sections being slots, after connected, the first and second slide guide sections together forming the slide guide sections.

16. The linkage-type synchronization module structure as claimed in claim 12, wherein the connected end sections of the first and second links are respectively formed with a first slide guide section and a second slide guide section extending in the extending/retracting direction of the extensible/retractable assemblies, the first and second slide guide sections being slots, after connected, the first and second slide guide sections together forming the slide guide sections.

17. The linkage-type synchronization module structure as claimed in claim 2, wherein the lateral slide guide sections are disposed on the relative slide member and extend in a straight form or an arched form.

18. The linkage-type synchronization module structure as claimed in claim 2, wherein the lateral slide guide sections are slide slots disposed on the relative slide member, while the movable slide guide members are pin members extending into the lateral slide guide sections.

19. The linkage-type synchronization module structure as claimed in claim 1, wherein the middle slide guide section is a slide slot disposed on the relative slide member.

20. The linkage-type synchronization module structure as claimed in claim 2, wherein the middle slide guide section is a slide slot disposed on the relative slide member.

21. The linkage-type synchronization module structure as claimed in claim 6, wherein the middle slide guide section and the lateral slide guide sections of the relative slide member are respectively slide slots, while the movable slide guide members are pin members extending into the lateral slide guide sections.

22. The linkage-type synchronization module structure as claimed in claim 9, wherein the middle slide guide section and the lateral slide guide sections of the relative slide member are respectively slide slots, while the movable slide guide members are pin members extending into the lateral slide guide sections.

23. The linkage-type synchronization module structure as claimed in claim 10, wherein the middle slide guide section and the lateral slide guide sections of the relative slide member are respectively slide slots, while the movable slide guide members are pin members extending into the lateral slide guide sections.

24. The linkage-type synchronization module structure as claimed in claim 11, wherein the middle slide guide section and the lateral slide guide sections of the relative slide member are respectively slide slots, while the movable slide guide members are pin members extending into the lateral slide guide sections.

25. The linkage-type synchronization module structure as claimed in claim 1, wherein two outer slide guide sections are respectively disposed on two lateral edges of one of the slide member and the relative slide member, the outer slide guide sections being guide rails formed of bent edges.

26. The linkage-type synchronization module structure as claimed in claim 2, wherein two outer slide guide sections are respectively disposed on two lateral edges of one of the slide member and the relative slide member, the outer slide guide sections being guide rails formed of bent edges.

27. The linkage-type synchronization module structure as claimed in claim 4, wherein two outer slide guide sections are respectively disposed on two lateral edges of one of the slide member and the relative slide member, the outer slide guide sections being guide rails formed of bent edges.

28. The linkage-type synchronization module structure as claimed in claim 6, wherein two outer slide guide sections are respectively disposed on two lateral edges of one of the slide member and the relative slide member, the outer slide guide sections being guide rails formed of bent edges.

29. The linkage-type synchronization module structure as claimed in claim 9, wherein two outer slide guide sections are respectively disposed on two lateral edges of one of the slide member and the relative slide member, the outer slide guide sections being guide rails formed of bent edges.

30. The linkage-type synchronization module structure as claimed in claim 17, wherein two outer slide guide sections are respectively disposed on two lateral edges of one of the slide member and the relative slide member, the outer slide guide sections being guide rails formed of bent edges.

31. The linkage-type synchronization module structure as claimed in claim 19, wherein two outer slide guide sections are respectively disposed on two lateral edges of one of the slide member and the relative slide member, the outer slide guide sections being guide rails formed of bent edges.

* * * * *